H. STAMM.
AUTOMATIC LOADING FIREARM.
APPLICATION FILED DEC. 15, 1913.

1,096,324.

Patented May 12, 1914.

Witnesses:
B. Dommers
E. Leckert

Inventor:
Hans Stamm,
By Henry ...
atty.

H. STAMM.
AUTOMATIC LOADING FIREARM.
APPLICATION FILED DEC. 15, 1913.

1,096,324.

Patented May 12, 1914.
5 SHEETS—SHEET 2.

H. STAMM.
AUTOMATIC LOADING FIREARM.
APPLICATION FILED DEC. 15, 1913.

1,096,324.

Patented May 12, 1914.
5 SHEETS—SHEET 5.

Witnesses:
B. Dommers
E. Leckert.

Inventor:
Hans Stamm,
By
Atty.

UNITED STATES PATENT OFFICE.

HANS STAMM, OF ST. GALLEN, SWITZERLAND.

AUTOMATIC-LOADING FIREARM.

1,096,324. Specification of Letters Patent. Patented May 12, 1914.

Application filed December 15, 1913. Serial No. 806,808.

*To all whom it may concern:*

Be it known that I, HANS STAMM, a citizen of the Republic of Switzerland, residing at Gallusstrasse, St. Gallen, Switzerland, have invented new and useful Improvements in Automatic-Loading Firearms; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to automatic loading firearms having a straight pull breech in which the energy for the automatic unlocking and opening of the breech, the loading, closing and re-locking of the breech is taken from the long recoil, which is imparted to the breech bolted to the barrel, by means of the high pressure powder gases occurring on discharging the rifle.

Automatic loading firearms of this description are already known, but the same are not suitable for the use of the new ammunition, the so-called pointed bullet cartridge. These cartridges, compared with the hitherto used cartridges with 2000-2500 atmospheres explosion pressure, have an increased powder charge, which on exploding, produces a pressure of 3500 to 4000 atmospheres and gives the bullet a greater penetrating force, a lengthened flight and therefore a greater carrying distance. Owing to this enormous pressure, the cartridge case is pressed with a correspondingly stronger pressure against the walls of the chamber in the barrel and is accordingly difficult to loosen. Just in this last point lies the reason why the hitherto known automatic loading rifles are not suitable for the pointed bullet ammunition, for as a matter of fact it has, up to the present, never succeeded to loosen and throw out the cartridges without difficulties, especially when they are not greased, nevertheless in these rifles the unbolting occurs during the recoil, which method however, besides possessing great drawbacks, results in a strong wearing of the whole breech.

In the improved barrel recoil automatic loader according to the present invention in which the breech in the breech-shoe, screwed to the barrel and guided in a stationary breech casing, is bolted by means of a breech-bolt rotatable by a bolt actuating sleeve and provided with bolt nibs, this drawback is removed and thereby an automatic loading rifle is obtained which is suitable for the use of the new ammunition and as a military rifle. For this purpose the arrangement is made such that the barrel as well as the breech are under separate spring pressures and that the unbolting or unlocking of the breech is performed in two stages. Since, on account of the recoil of the barrel and of the breech bolted to same, the barrel strikes against a rigid stop situated in the center of gravity of the weapon, the bolt operating sleeve is flung farther back by the live force imparted to same, as a result of which the breech bolt is turned and thereby partly unbolted and accordingly a loosening of the discharged cartridge case takes place. As, however, the barrel and breech are again flung forward by the counter effect of the two tensioned springs, the bolt operating sleeve strikes with violence against a locking apparatus and is temporarily arrested by same, while the barrel with the breech and breech shoe continues forward under the effect of the force imparted to same and under the effect of its spring, thus tearing the breech bolt from the operating sleeve, rotating the breech bolt and thereby completely unlocking the breech, so that the now quite loosened cartridge case is drawn from the barrel. Shortly before the barrel has reached its foremost position, the bolt operating sleeve is released by the locking apparatus and the entire breech now also springs forward under the force of the still tensioned breech closing spring, pushing a new cartridge into the barrel, whereupon the bolting again takes place.

A form of construction of the invention is shown by way of example in the accompanying drawings.

Figure 1:
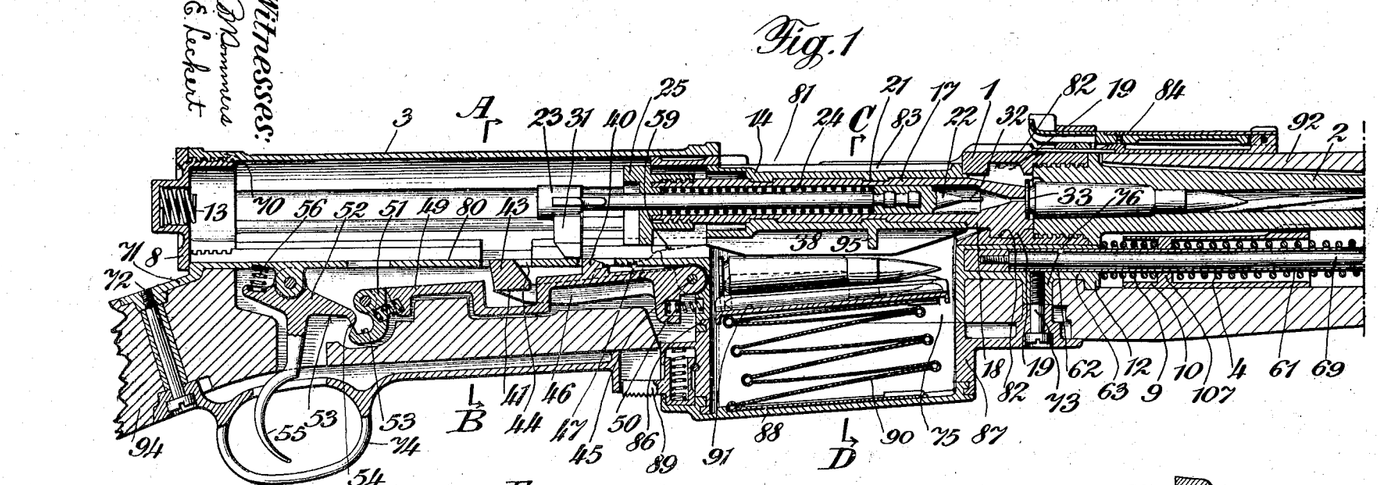
Figure 1 is the automatic loading weapon in vertical section through the breech, the magazine and the drawing out apparatus, Fig. 1ª is a vertical section through the forepart of the barrel and the front band.
Figure 1A:
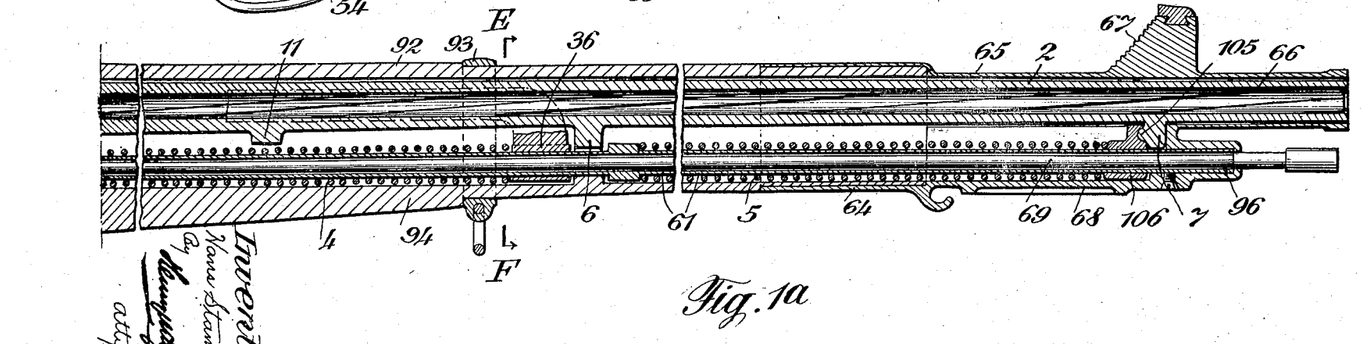
Figure 12:
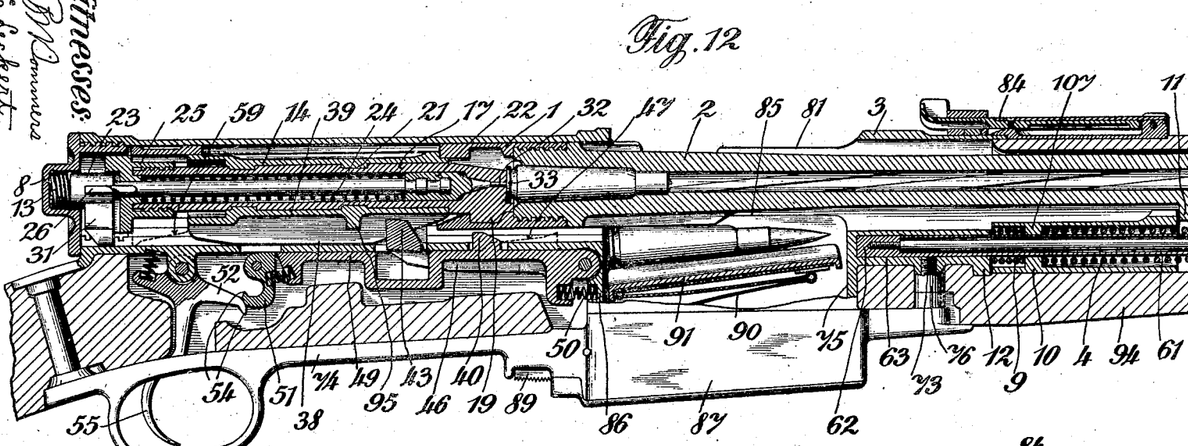
Figs. 12 to 14 show the weapon in vertical section in different positions of the breech.

As shown, the improved automatic loading weapon with barrel recoil, formed like a military rifle, is provided with a barrel 2 movable in its longitudinal axis and screwed on to a cylindrical breech shoe 1, which two parts are guided in an outer breech casing 3 (Fig. 1). Beneath the barrel, two long strong spiral springs 4 and 5 are mounted, which on the backward movement of the barrel and the breech bolted to same, are compressed or tensioned respectively and hereby store the necessary energy, in order to be able afterward to thrust first the barrel and then the breech forward into the closing position. Two projections are provided beneath the barrel, of which the back projection 6, only by partial hand manipulation, acts on the spring 4 (closing spring) and the front projection 7 on the spring 5 (barrel spring) for the purpose of compressing the same. The barrel 2 possesses a third projection 11 (Fig. 1ᵃ) situated behind the projection 6 for limiting the recoil of the barrel. In order to prevent the back part of the breech from striking the closing cap 8 of the breech casing 3 at the end of the long recoil a strong buffer spring 9 is arranged behind the closing spiral spring 4 which buffer spring, situated in a sleeve 10 provided with a dividing wall 107, receives the last shock of the barrel and its projection 11 (Fig. 1). The complete recoil distributed to the springs 4 and 5 and the buffer spring 9 is received on the most suitable part of the breech casing 3, that is, on the striking surface 12 of the casing, situated in the center of gravity of the weapon (Fig. 12). The buffer spring lies between the surface 12 and the dividing wall 107 of the sleeve, against which latter the closing spring 4 also rests. In the closing cap 8 a buffer spring 13 is also provided for the back moving striking pin 23 (Figs. 1 and 12).

Figure 2:
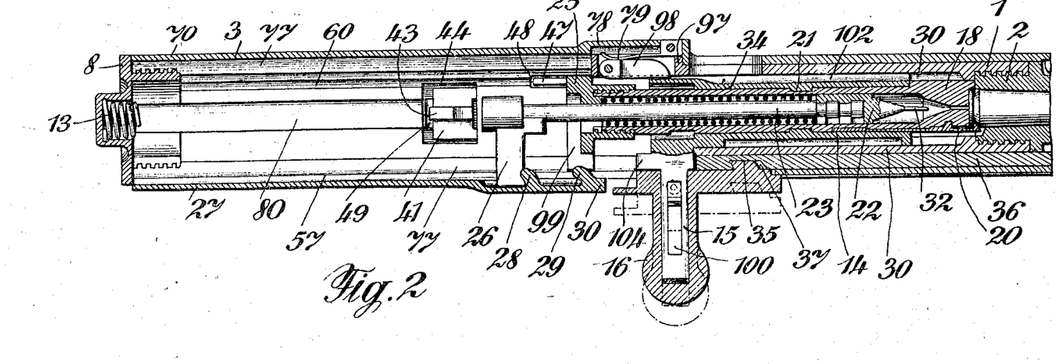
Fig. 2 is a horizontal section through the axis of the breech according to Fig. 1, Figs. 3 and 4 are sections on the lines A—B and C—D of Fig. 1.
Figure 6:
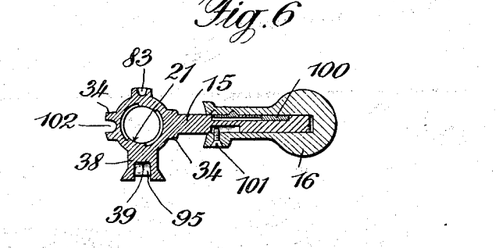
Figs. 6 to 11 are constituent parts of the weapon partly in elevation and partly in section.
Figure 13:
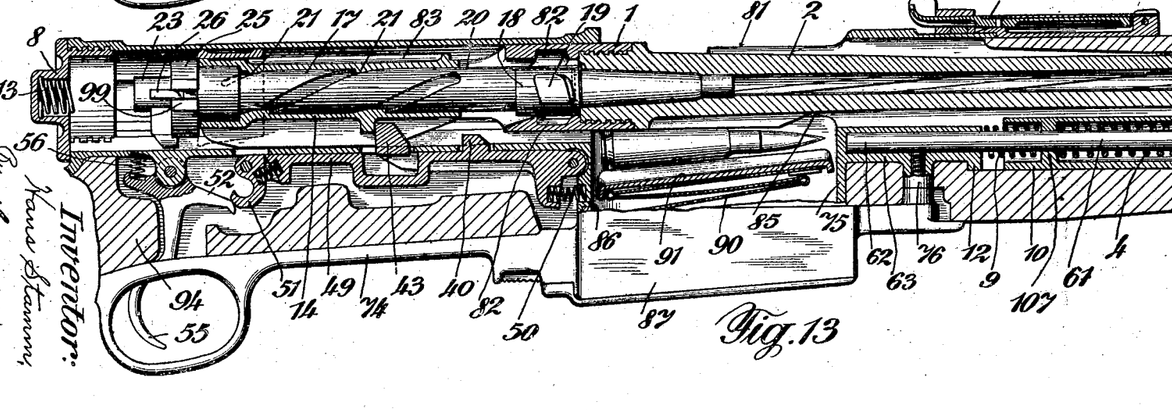

The breech mounted in the breech shoe 1 is a straight pull breech and comprises two main parts, namely the bolt operating sleeve 14 and the breech bolt 17. On the right and left of the sleeve, horizontal guiding strips 34 (Figs. 2, 4, 6 and 14) are arranged. At the top the strip 83 is arranged and at the bottom the guiding strip 38 for guiding and locking the bolt operating sleeve; also at the back, on the right hand side, an arm 15 on which the sleeve handle 16 is movably mounted (Fig. 6). On the head 18 of the breech bolt 17 two diametrically arranged bolt nibs 19 are mounted (Figs. 1 and 13), as also the resilient cartridge extractor 20 (Figs. 2 and 13). This breeech bolt 17 has the same axis as the sleeve 14, and the breech bolt head 18 with its two nibs 19 and the extractor, project in front out of the bolt operating sleeve 14 (Fig. 1). The breech bolt 17 can reciprocate in the sleeve 14, in which case, however, it is compelled to rotate at the same time by the sleeve 14, by means of flat spiral ribs 21 which project into correspondingly shaped grooves of the breech bolt 17 (Fig. 13). The bolt operating sleeve 14 is not rotatable; it can only move backward and forward with the strips 34 and 83 in corresponding grooves of the breech shoe and with the strip 38 in the groove 80 of the breech casing 3.

Figure 3:
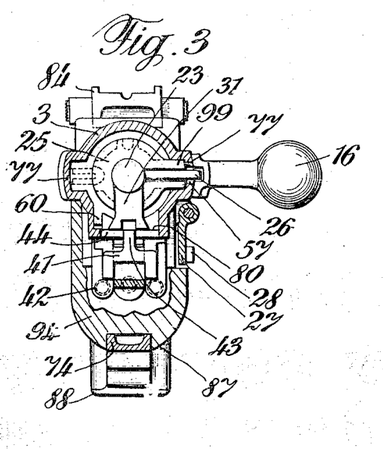

In the hollow breech bolt 17, the striking apparatus is mounted in the known manner. The same consists of the easily removable hammer 22, which is coupled to the front end of a striker 23. Between the hammer and a nut 25 screwed on the back end of the breech bolt, the striking spring 24 is arranged. The nut 25 is provided with a guide strip 99 on its right hand side (Figs. 2 and 3), which projects into the right hand side groove 77 of the breech casing 3, whereby the nut is prevented from turning. The nut 25 possesses also a cavity, in which the projection 104 of the sleeve arm 15 (Figs. 14 and 15) lies on unbolting the breech; when the breech is extracted the projection 104 in this position assures a common rotation of sleeve and nut. The striker 23 is provided at the right hand side of its back end, with a horizontal arm 26 (Figs. 2 and 3), which projects outward through the longitudinal slot 57 of the breech casing 3. This slot 57 is closed by a hinged lid 27 with two cams 28 and 29 (Figs. 2 and 3), and the striker is secured by means of these cams before or after the discharge, and one of the two cams, on closing the lid 27, always lies in front of the striker arm 26 situated within its range. At the same time the front end 30 of the lid 27 lies behind the sleeve handle 16 and secures the whole breech from further manipulation. When using the rifle the lid 27 is turned down (Fig. 3), the slot 57 is then free for the movement of the breech. Also at the back end of the striker 23 the projection 31 pointing downward is forged on, for arresting the striker (Figs. 1 and 3). On opening the breech, the striker 23 is forced back by the breech bolt 17 to such an extent that the hammer point 32 no longer touches the cartridge primer 33.

Figures 8, 10, 11:
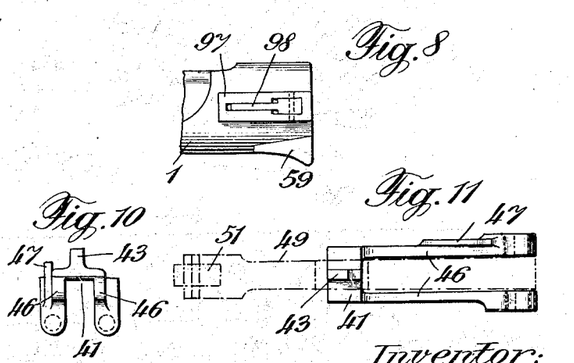
Figure 9:
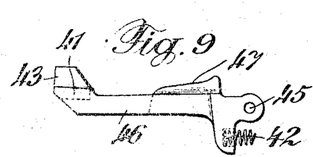

On the real handle 16 of the breech operating sleeve 14, pushed over the arm 15 of the sleeve, which is movable at right angles to the sleeve and rifle axis, a projection 35 (Fig. 2) is situated which projects into a cavity 37 of the closing spring guide 36, which latter engages with the breech closing spring 4 situated beneath the barrel 2, so that by moving the handle 16, the sleeve 14 can be coupled with or uncoupled from the spring 4, according to desire, by means of the closing spring guide. For securing the sleeve handle 16 in its coupled or uncoupled or inner or outer position respectively the adjusting spring 100 is used which is laid in the arm 15 of the sleeve and can snap its cam into a corresponding cavity in the handle 16. The movement of the handle 16 is limited by an adjusting screw 101, which projects into a groove on the arm 15 (Fig. 6). The already mentioned long dove tail shaped guide strip 38 of the sleeve is provided underneath, in a longitudinal direction, with a deep groove 39 (Fig. 6), which is interrupted at a certain point by a projection 95 (Figs. 1 and 4) which can strike against a cam of the locking apparatus projecting into said groove (Fig. 13). This locking apparatus consists of a fork-shaped lever 41 (Figs. 9 to 11), the front prongs 46 of which are rotatably mounted beneath the breech casing 3 on the back magazine wall 86, and which is pressed upward by means of the spring 42 (Fig. 9). At the back end, in the middle of the fork-shaped lever, a strong obstructing nose 43 (Fig. 10) is mounted, which projects into the course of the lower closing sleeve strip 38 through an opening 44 and coöperates with the projection 95 of said strip. In the immediate proximity of the point of rotation 45 of the lever 41, a long sloping projection 47 is provided on the left prong 46 of said lever 41 (Figs. 9 and 10), which projection projects through an opening 48 in a longitudinal groove 60 of the breech casing 3.

The sear 49 of the trigger apparatus arranged beneath the breech casing 3, carries, as already mentioned, the projection 40 and is arranged between the two fork prongs 46 of the locking lever 41 (Figs. 1, 3 and 11) and is also mounted on the back wall 86 of the magazine rotatable under the pressure of the spring 50 which strives to press the sear 49 upward. The back end of this sear 49 carries the pivoted pawl 51 standing under spring pressure, with which pawl the tongue 52 of the trigger 55 standing under the pressure of the spring 56, coöperates. Said trigger is rotatably mounted on a stationary axle of the breech casing 3 (Fig. 1). The pawl 51 as well as the tongue 52 of the trigger have at their outermost ends, which are bent toward each other, a short straight surface 53 and a small projection 54 which runs to an edge.

Figure 7:
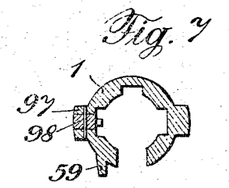
Figure 14:
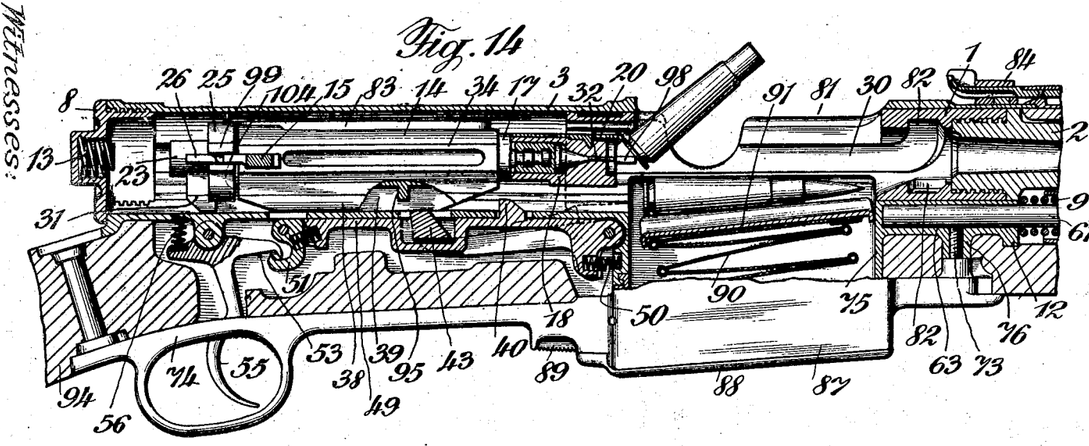
Figure 15:
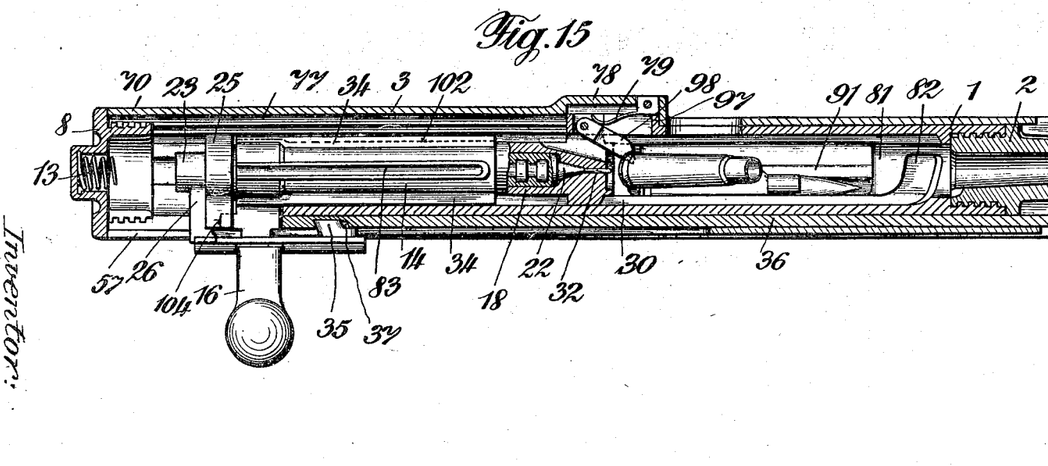
Fig. 15 is a horizontal section through Fig. 14, Figs. 16 to 18 show the complete weapon partly in section and in different positions of the barrel and breech mechanism.

The cylindrical breech shoe 1 screwed at the back on the barrel 2 is also provided at the back end on the left lower side with a sloping projection 59 (Figs. 1, 7 and 8), which can reciprocate in the above mentioned longitudinal groove 60 of the breech casing 3 and coöperates with the obstructing cam 43 of the locking lever 41 for releasing the bolt operating sleeve. Also at the back on the left hand side of the breech shoe 1 a long projection 97 is situated with a pivoted ejector 98 (Figs. 2, 7 and 8), which projection serves as a guide for the shoe 1 and the barrel 2 and can reciprocate in the left side groove 77 (Fig. 2) of the breech casing. Inside the breech shoe 1 the grooves 30 are milled on both sides (Figs. 7 and 14), which serve for guiding the lateral sleeve strips 34, as also the locking nibs 19 on the bolt head. These grooves 30 are provided at their front ends with lateral niches 82 (Figs. 1, 13 and 14), in which the nibs 19 can be rotated with the object of bolting the breech. The left sleeve strip 34 and the head 18 of the breech bolt 17 are each provided with a guiding groove 102 and 103 respectively for the cartridge case ejector 98, in which the same slides on opening and closing the breech (Fig. 15).

The closing spring 4 as well as the barrel spring 5 are pushed on to a long guide tube 61 (Fig. 1ᵃ), the back end 62 of which is rigidly supported in a long cylindrical piece 63 of the breech casing 3 and secured by the screw 73, while the front end 96 of this tube is well supported and rigidly screwed in the front band 64 of the rifle (Figs. 1ᵃ and 16–18) and accordingly produces a reliable rigid connection between the front and back part of the rifle. The front sleeve-shaped end of the closing spring guide 36, against which the closing spring 4 rests, grips around the tube 61 (Fig. 1ᵃ). On the front band 64, the protecting and guiding tube 65 is situated for the front barrel end 66 with the sight base 67 and underneath, a long strip 68 for securing the bayonet (Fig. 1ᵃ). The guiding tube 61 for the springs 4, 5 and 9 serves also for receiving the wiping rod 69, which projects in front so far from the front band 64, that the rifle can be stacked with others. 92 is the hand protector of the rifle stock 94 lying over the barrel 2 (Fig. 1ᵃ).

The outer cylindrical breech casing 3 embedded in the stock 94 (Figs. 1 and 1ᵃ and 3 and 4) serves principally for inclosing the whole rifle mechanism and also to protect the marksman from accidents when shooting. At its hindmost end 70, this casing 3 is closed by the screwed, easily removable, closing cap 8 with the buffer spring 13 (Figs. 1 and 1ᵃ). Immediately beneath the cap the strong projection 71 is situated for receiving the cross screw 72, which connects the trigger guard 74 with breech casing 3 and the stock 94 (Fig. 1). On the lower part of the breech casing 3 the one part 75 of the two-parted cartridge magazine is situated, also behind same the support for the sleeve locking apparatus and the whole trigger mechanism, and in front, adjoining the magazine, the long cylindrical piece 63 for the spring guiding tube 61 with the pin 76 for the front guard screw 73 (Fig. 1). The piece 63 provided with the striking surface 12 at its front end serves as a limiting piece for the backward movement of the barrel. Inside the breech casing 3 the longitudinal grooves 77 are situated, of which the groove situated on the left hand side (Fig. 3) serves for guiding the breech shoe 1 with barrel 2 through the ejector projection 97 and the groove on the right hand side serves for guiding the breech bolt nut 25 through guiding strip 99, as also for guiding the sleeve handle 16 and closing spring guide 36 (Fig. 2). On the left outer side of the casing 3 the long projection 78 is situated with ejector spring 79 supported in same and separated from the ejector (Fig. 2). On the inner lower side the already mentioned longitudinal groove 80 is situated for the lower dove tail shaped sleeve strip 38 and for the same shaped striker projection 31, also the longitudinal groove 60 for the sloping projection 59 of the breech shoe 1 for pressing down the locking apparatus (Fig. 2). On the right hand outer side of the breech casing 3 the further above described hinged lid 27 is mounted (Fig. 3). Vertically above the magazine 75 the loading opening 81 is arranged just above the loading opening of the breech shoe and on the top at the foremost part of the breech casing 3 the sight 84 is arranged (Fig. 1).

Figure 4:
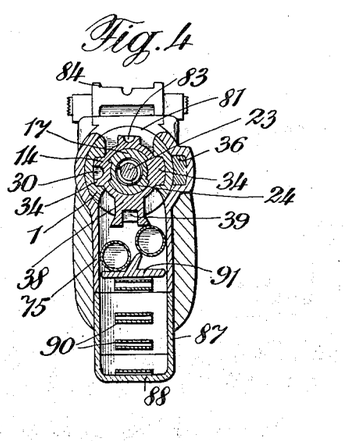
Figure 5:
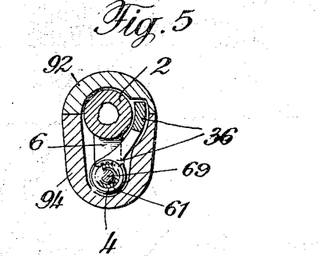
Fig. 5 is a section on the line E—F of Fig. 1ᵃ.

The cartridge magazine 75 is arranged on the breech casing 3 vertically beneath the loading opening 81 and the magazine passage 85 (Figs. 1 and 4). The same consists of two parts; the upper already mentioned main part 75 directly adjoining the magazine passage 85, and the lower part 87, comprising one piece with the trigger guard 74, in which part the movable magazine floor holder 89 connected with the floor 88 of the magazine, is arranged. The magazine spring 90 is connected at one end with the magazine floor and at the other end with the cartridge conveying plate 91 (Fig. 1) so that these three parts can be taken as one piece from the rifle. The two magazine parts 75 and 87 are connected with the breech casing 3 by means of the guard 74, by the cross screw 72 and the guard screw 73, as also by the cross strip 86 laid into the lower part of the back wall of the magazine.

The manipulation and operation of the described rifle is as follows: In order to be able to load the rifle, the breech must first be opened by hand. It is very important that the breech, during the slipping of the cartridges from the mounted loader into the magazine, does not stand under the pressure of the closing spring, for, as soon as the cartridge plate, on which the breech, standing under the pressure of the closing spring, strikes, must leave its place on account of the cartridges pressed into the magazine, then the whole closing spring pressure is transferred by the breech to the loader, which now becomes jammed and is with difficulty removed by hand by a special handle. In this invention, during the opening of the breech, the movable sleeve handle is pressed slightly outward and uncoupled from the closing spring; the breech then remains open. After stripping the cartridges from the loader into the magazine the breech is pushed forward by hand in a straight line, that is it is closed, and the loader falls down of its own accord, that is, it is pushed out by the breech bolt head. During the closing of the breech by hand the rifle can, according to desire, be adjusted for automatic shooting or as a single loader, by simply pressing the handle in.

Figures 16, 17, 18:
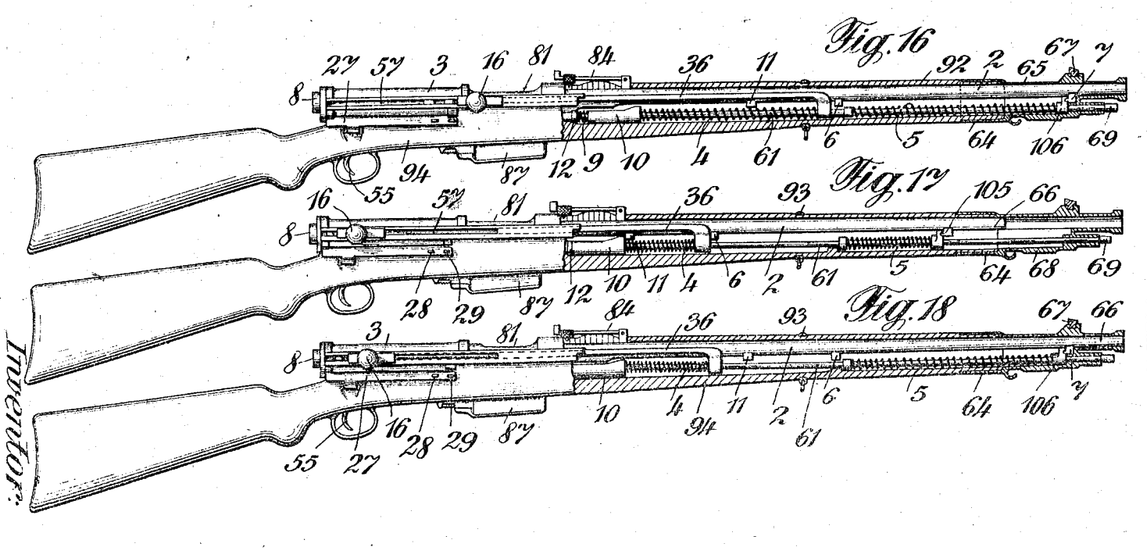

Assumed a cartridge is pushed into the barrel by closing the breech by hand, and the rifle is ready for automatic shooting, then the barrel and the breech bolted with same, assume the front position as shown in Figs. 1 and 16. In this position, the striker 23 is tensioned, that is, its projection 31 is caught by the sear projection 40 of the sear 49 and the striking spring 24 is compressed. The handle 16 on the sleeve engages with the projection 35 in the cavity 37 on the closing spring guide 36 (Fig. 2), also the tongue 52 of the trigger 55 is engaged with the pawl 51 of the sear 49, that is, it lies above same.

For firing the cartridge the trigger 55 is drawn back, so that the tongue 52, which is thus turned down influences the pawl 51 and by means of the same turns the sear 49 downward. In this case the two small projections 54 on the tongue and pawl, touch each other, that is, they form a so-called pressure point on pulling the trigger 55 still farther back, the two projections 54 engage each other and therefore the sear 49 is pressed completely down (Fig. 1) and the striker 23 is released by the sear projection 40, which is also pressed down, the striker, under the influence of the spring 24, then springs forward and fires the shot, while the sear 49, released at the same moment by the tongue 52 on the pawl projection 54, springs up again under the influence of its spring. After releasing the trigger 55, its tongue 52, under the effect of its spring 56, after the evading of the pawl 51, is pressed over, and then lies above the same.

On account of the enormous gas pressure, which is caused on firing the cartridge by the explosion of the powder in the cartridge case and which acts on all sides, the barrel and the breech bolted to the breech shoe 1 is flung back, so that by means of the projection 7 the barrel spring 5 and, by means of the guide 36 coupled with the breech, with its sleeve-shaped front end gripping around the tube 61, on recoiling also the closing spring 4 is compressed and the barrel with the projections 11 passes on to the sleeve 10, which latter under the compression of the buffer spring 9 strikes against the surface 12 of the piece 63 (Figs. 12 and 17). By means of this blow performed with great force and the sudden stopping of the barrel with breech shoe and breech, caused by the same, the bolt operating sleeve 14 is flung farther back, due to the live force imparted to same. By means of the movement, which the operating sleeve 14 continues alone after the barrel, the breech shoe and the breech bolt become stationary, the breech bolt 17 is turned an extent corresponding to the size of the movement of the sleeve, by means of the spiral rib 21, and therefore considerably loosens the empty cartridge case in this first stage of the preparation for unbolting, by the raising of its breech nibs. The striker 23 also moving back, is stopped by the buffer spring 13.

On the backward movement of the breech shoe with breech and barrel, the locking cams 43 of the locking lever 41 and the projection 40 of the sear, which penetrate upward into the path of the operating sleeve 14 and the striker projection 31, are pressed down by the same, and immediately spring up again after the sleeve has passed.

According to the above described operations, after the standing still of the whole recoil, the still partly bolted breech is flung forward by the reaction of the two springs 4 and 5, and the bolt actuating sleeve 14 is thus flung with considerable force against the strong obstructing cam 43 projecting into the path of the projection 95, and is temporarily stopped by the same and the closing spring 4 is therefore held compressed, while the barrel with the breech shoe is flung farther forward with violence by the effect of the two springs 4 and 5, that is, it is moved into its foremost position (Figs. 13 and 18) with the result that the breech bolt 17, which is still partly bolted to the breech shoe, is drawn by the breech shoe a distance out of the sleeve 14, the sleeve 14 being held fast; by means of the spiral rib 21, the breech bolt 17 is turned to the left and thereby the breech is completely unbolted. The barrel with the unbolted breech shoe now springs alone farther forward, while the unbolted breech bolt is held back behind the loading opening by the bolt operating sleeve 14. After the barrel with the breech shoe has assumed its foremost initial position, the loosened empty cartridge case is ejected at the last moment by the ejector arranged behind the breech shoe (Figs. 14 and 15). This last operation occurs in such a manner that the ejector 98, separated from the ejector spring 79, on the backward movement of the barrel and breech shoe, as well as during the forward movement of the same, toward the end of the forward movement, is brought to lie within the acting range of the spring 79, that is, beneath same, and, by means of the same is pressed into the guiding groove 103 on the breech bolt head 18 (Fig. 15), on the front end of which it strikes against the empty cartridge case and ejects the same. At the same time, however, a new cartridge is raised in the magazine opening 85 and brought into the path of the breech bolt 17 (Fig. 14).

Immediately before the end of the forward movement of the barrel and breech shoe the sloping projection 59 provided on the latter runs on the projection 47, on the locking lever 41 and thereby presses the same down, and releases the sleeve 14 (Fig. 1), which under the reaction of the still compressed but now relaxing spring 4, also springs into its former position. The sear projection 40 standing ready in the path of the striker projection 31 prevents the striker 23 from again springing forward and unintentionally firing another shot; the striker is therefore caught by its projection 31 meeting with the sear projection 40. When the sleeve springs forward it takes the breech bolt along under a simultaneous compression of the striking spring 24, so that the breech bolt pushes the highest cartridge lying in its path into the barrel. The breech bolt, pressing against the back end of the barrel, is turned to the right by the bolt actuating sleeve 14 moving still farther forward and under the influence of the spiral rib 21 the bolt nibs 19 of same are turned into the niches 82 on the breech shoe 1, and the breech is therefore again bolted. The rifle is now again ready for use.

The use of a magazine divided into two parts, as also the rigid connection between the breech casing and the front band carrying the guide for the barrel and the sight, permits, by releasing the two screws 72 and 73, and after removing the hand protector 92 and the lower hand 93, the whole upper part of the rifle, together with the spring guiding tubes 61, with springs, and the front band 64, to be removed from the stock 94 as a whole with the help of the projection 105 on the barrel projection 7 gripping into the spring sleeve 106 (Fig. 1ª). After removing the spring-guiding tube 61 and after unscrewing the cap 8 of the breech casing, the barrel 2 together with the breech shoe 1 can be just as easily extracted from the breech casing 3. The rigid connection formed by the guiding tube 61, between the casing 3 and the front band 64 provided with the sight, prevents the movement of the barrel and the precision of the shot from being influenced by the shrinking of the wood stock due to the change in the temperature and by the jamming of the barrel caused thereby.

The complete breech differs on the whole only substantially from those of the hitherto known ordinary modern military rifles. As, in the latter, the complete breech can, by means of the handle 16, after removing the closing cap 8 of the breech casing 3, be extracted from the rifle and reinserted in one piece. In other automatic loading rifles, it is impossible to do this in such a simple manner. This is effected by the peculiar formation of the bolt actuating sleeve handle 16, which permits, before or during the drawing back of the breech by hand by a simultaneous simple lateral moving of the handle 16 to uncouple the same from the closing spring 5 (Fig. 2 dotted position of the handle 16) or to again couple with the same, in which case the handle 16 is held in position by the adjusting spring 10C (Fig. 6). This arrangement renders it possible for the automatic loading rifle to be changed into a partial hand repeating rifle, owing to the fact that by a single thrust on the movable sleeve handle 15, the breech is uncoupled from the closing spring 5; this, however, possesses the considerable advantage, that the strong recoil is now received and reduced to a minimum by the two springs 4 and 5 as well as by the buffers 9 and 10, just because by partial manipulation, the recoil of the barrel is now directly transferred by the projection 6 to the spring 4. Further, the above described peculiarity of the automatic loading rifle, by partial manipulation is brought into most prominent consideration at this point, that the breech must also automatically open and unbolt, owing to the fact that, by this manner of shooting, both springs at the top thrust the barrel forward and therefore open and unbolt the breech with double force, a failure to act is therefore quite impossible. The manipulation by soldiers, with the closing spring switched out, is only limited by the fact that the breech is to be pushed forward in a straight line by hand, to be closed. The possibility is therefore offered to the soldiers to use the rifle as a complete automatic loading weapon or to close the breech by hand, according to the position of the fight.

The above described and illustrated automatic loading rifle has the following advantages compared with automatic loading rifles of the type already known:

1. The opening of the breech occurs after the shot has left the barrel a short time and after the finish of the recoil. During the whole of the development of the force of the recoil, the breech, as in an ordinary rifle, remains completely bolted, so that therefore no extraordinary wear of the rubbing parts takes place, as opposed to all other automatic loading rifles, in which the breech is unbolted before the finish of the recoil, by said recoil, with great force, accordingly, the rubbing parts rapidly wear down, and also at this last shock, the accuracy of the aim of the weapon must be influenced. The great advantage of this automatic loading rifle in the automatic opening of the breech consists in that the unbolting rotation of the breech bolt is performed in two stages. In the first stage the jammed cartridge case is considerably loosened, owing to the fact that after the heavy striking of the barrel during the recoil, the bolt operating sleeve is driven farther backward alone, thus rotating the breech bolt and preparing the unbolting. In the second stage, the barrel and the complete breech are again flung forward by two long strong springs, so that now the sleeve strikes with force against the obstructing cam and is held fast, and the barrel, which has been flung forward, pulls the breech bolt from the operating sleeve, rotating and completely unbolting same, thus still further loosening the empty cartridge case which can then be easily extracted and thrown away.

2. A further considerable advantage consists in that between the temporary stopping of the breech and the springing forward of same, sufficient time is allowed for conveying a new cartridge into the path of the breech bolt.

3. As the striking of the barrel or the buffer sleeve 10, causing the recoil to stop, takes place at the most suitable part of the rifle, namely in front of the breech casing, on the surface 12 situated just in front of the center of gravity of the rifle, immediately next to the axis and vertically beneath the same, it is prevented, compared with other automatic rifles in which the recoil is limited by the striking of the breech against the member closing the casing, that the breech eventually knocks out the closing cap 8 on the breech casing and that the back closing parts are damaged by the eventual concussion.

4. The breech can be uncoupled from the closing spring at any moment, in the simplest manner by merely pushing the movable breech handle or sleeve handle outward, so that now the weapon can be partly manipulated as a hand rifle. In this case the operation of the rifle is even simpler than with ordinary military rifles, as the soldier only has to push the breech in a straight line to close same. The opening and extracting of the empty and very tightly held cartridge case, which operation requires considerable force, is performed automatically at each shot with perfect safety.

5. For the purpose of cleaning the rifle the breech can be taken out and reinserted by its handle, in one piece, as in ordinary rifles, so that the soldier can leave the automatic arrangement entirely out of consideration.

What I claim is:

1. In an automatic loading firearm having a straight pull breech and a sliding barrel, the barrel and the breech being under the influence of separate spring pressures, a breech shoe screwed to the barrel and guided in a stationary breech casing, a breech bolt having nibs, a bolt actuating sleeve for rotating said breech bolt to lock it in the breech shoe, a stationary limiting piece situated near the center of gravity of the firearm against which strikes, with force, the barrel to impart to the bolt operating sleeve sufficient live force to fly alone backward for partly unbolting, in a first stage, the breech bolt, and obstructing means temporarily holding up the bolt actuating sleeve while the barrel with the breech shoe is flung again forward in order to completely unlock the breech bolt in a second stage and draw out the disconnected cartridge case from the barrel, which was partly loosened while the bolt actuating sleeve was flung alone backward.

2. In an automatic loading firearm having a straight pull breech and a sliding barrel, the barrel and the breech being under the influence of separate spring pressures, a breech shoe screwed to the barrel and guided in a stationary breech casing, a breech bolt having nibs, a bolt actuating sleeve for rotating said breech bolt to lock it in the breech shoe and provided with a projection, a stationary limiting piece situated near the center of gravity of the firearm against which strikes, with force, the barrel to impart to the bolt operating sleeve sufficient live force to fly alone backward for partly unbolting, in a first stage, the breech bolt, a cartridge magazine arranged beneath the breech casing, a spring actuated locking lever consisting of a fork-shaped lever horizontally mounted on the back wall of the magazine beneath the breech shoe, a cross piece on said lever carrying an obstructing nose projecting in a guiding groove of the bolt actuating sleeve on the forward movement of the barrel and breech shoe and engaging thereby the projection of the bolt actuating sleeve which is then held up in order to completely unlock the breech bolt in a second stage and draw out the disconnected cartridge case from the barrel, which was partly loosened while the bolt actuating sleeve was flung alone backward, and a projection on said breech shoe acting upon said lever to release the bolt actuating sleeve on the forward movement of the barrel with the breech shoe.

3. In an automatic loading firearm having a straight pull breech and a sliding barrel, the barrel and the breech being under the influence of separate spring pressures, a breech shoe screwed to the barrel and guided in a stationary breech casing, a breech bolt having nibs, a bolt actuating sleeve for rotating said breech bolt to lock it in the breech shoe and provided with a projection, a stationary limiting piece situated near the center of gravity of the firearm against which strikes with force the barrel to impart to the bolt operating sleeve sufficient live force to fly alone backward for partly unbolting, in a first stage, the breech bolt, a cartridge magazine arranged beneath the breech casing, a locking lever horizontally mounted on the back wall of the magazine beneath the breech shoe and consisting of two fork-shaped arms, springs acting upon each of these arms, a long sloping projection on one of these arms, a cross piece on said lever carrying an obstructing nose projecting in a guiding groove of the bolt actuating sleeve on the forward movement of the barrel and breech shoe and engaging thereby the projection of the bolt actuating sleeve which is then held up in order to completely unlock the breech bolt, in a second stage, and draw out the disconnected cartridge case from the barrel, which was partly loosened while the bolt actuating sleeve was flung alone backward, and a projection on said breech shoe engaging the long sloping projection of said fork-shaped lever arm to gradually release the bolt actuating sleeve on the forward movement of the barrel with the breech shoe.

4. In an automatic loading firearm having a straight pull breech and a sliding barrel provided with a projection, the barrel and the breech being under the influence of separate spring pressures, a breech shoe screwed to the barrel and guided in a stationary breech casing, a breech bolt having nibs, a bolt actuating sleeve for rotating said breech bolt to lock it in the breech shoe, a stationary limiting piece situated near the center of gravity of the firearm against which strikes with force the barrel to impart to the bolt operating sleeve sufficient live force to fly alone backward for partly unbolting, in a first stage, the breech bolt, a buffer spring arranged between said limiting piece and a spring closing the breech, a sleeve movably arranged between said buffer spring and the spring closing the breech and having a dividing wall, said sleeve engaging the projection provided on the barrel on the backward movement of the latter and arresting the backward movement of the barrel when it strikes after the compression of the buffer spring against the limiting piece, and obstructing means temporarily holding up the bolt actuating sleeve while the barrel with the breech shoe is flung again forward in order to completely unlock the breech bolt in a second stage and draw out the disconnected cartridge case from the barrel, which was partly loosened while the bolt actuating sleeve was flung alone backward.

5. In an automatic loading firearm having a straight pull breech and a sliding barrel, the barrel and the breech being under the influence of separate spring pressures, a breech shoe screwed to the barrel and guided in a stationary breech casing, a breech bolt having nibs, a bolt actuating sleeve for rotating said breech bolt to lock it in the breech shoe, a stationary limiting piece situated near the center of gravity of the firearm against which strikes with force the barrel to impart to the bolt operating sleeve sufficient live force to fly alone backward for partly unbolting, in a first stage, the breech bolt, said limiting piece being provided on the front end of the breech casing and forming with the latter a whole, and obstructing means temporarily holding up the bolt actuating sleeve while the barrel with the breech shoe is flung again forward in order to completely unlock the breech bolt, in a second stage, and draw out the disconnected cartridge case from the barrel, which was partly loosened while the bolt actuating sleeve was flung alone backward.

6. In an automatic loading firearm having a straight pull breech and a sliding barrel, a breech shoe screwed to the barrel and guided in a stationary breech casing, a breech bolt having nibs, a bolt actuating sleeve for rotating said breech bolt to lock it in the breech shoe, a barrel spring and a breech closing spring, a stationary guide arranged in the same direction as and beneath the barrel, said springs being arranged in such a way on said guide that they are capable of being compressed and untensioned one independently from another, a stationary limiting piece situated near the center of gravity of the firearm against which strikes with force the barrel to impart to the bolt operating sleeve sufficient live force to fly alone backward for partly unbolting, in a first stage, the breech bolt, and obstructing means temporarily holding up the bolt actuating sleeve while the barrel with the breech shoe is flung again forward in order to completely unlock the breech bolt, in a second stage, and draw out the disconnected cartridge case from the barrel, which was partly loosened while the bolt actuating sleeve was flung alone backward.

7. In an automatic loading firearm having a straight pull breech and a sliding barrel, a breech shoe screwed to the barrel and guided in a stationary breech casing, a breech bolt having nibs, a bolt actuating sleeve for rotating said breech bolt to lock it in the breech shoe, a stationary limiting piece situated near the center of gravity of the firearm against which strikes with force the barrel to impart to the breech operating sleeve sufficient live force to fly alone backward for partly unbolting, in a first stage, the breech bolt, a barrel spring, a breech closing spring and a buffer spring, a stationary guide arranged in the same direction as and beneath the barrel, said three springs being arranged on said guide, whereby the barrel spring and the breech closing spring are capable of being compressed and untensioned one independently from another, a stationary limiting piece situated near the center of gravity of the firearm against which strikes with force the barrel to impart to the bolt operating sleeve sufficient live force to fly alone backward for partly unbolting in a first stage the breech bolt and obstructing means temporarily holding up the bolt actuating sleeve while the barrel with the breech shoe is flung again forward in order to completely unlock the breech bolt, in a second stage, and draw out the disconnected cartridge case from the barrel, which was partly loosened while the bolt actuating sleeve was flung alone backward.

8. In an automatic loading firearm having a straight pull breech and a sliding barrel, a breech shoe screwed to the barrel and guided in a stationary breech casing, a breech bolt having nibs, a bolt actuating sleeve for rotating said breech bolt to lock it in the breech shoe, a barrel spring and a breech closing spring, a stationary rod arranged in the same direction as and beneath the barrel, said springs being so arranged on said rod that they are capable of being compressed and untensioned one independently from another, said rod being loosely connected to a guide provided on the breech casing and to a second guide provided in the front band of the rifle, carrying the sight, and having also a guide for the front barrel end, the rod forming further a rigid connection between said band and the breech casing, a stationary limiting piece situated near the center of gravity of the firearm against which strikes with force the barrel to impart to the bolt operating sleeve sufficient live force to fly alone backward for partly unbolting, in a first stage, the breech bolt, and obstructing means temporarily holding up the bolt actuating sleeve while the barrel with the breech shoe is flung again forward in order to completely unlock the breech bolt, in a second stage, and draw out the disconnected cartridge case from the barrel, which was partly loosened while the bolt actuating sleeve was flung alone backward.

9. In an automatic loading firearm having a straight pull breech and a sliding barrel, a breech shoe screwed to the barrel and guided in a stationary breech casing, a breech bolt having nibs, a bolt actuating sleeve for rotating said breech bolt to lock it in the breech shoe, a barrel spring and a breech closing spring, a stationary rod arranged in the same direction as, and beneath, the barrel, said springs being so arranged on said guide that they are capable of being compressed and untensioned one independently from another, a wiping rod arranged inside said rod, a stationary limiting piece situated near the center of gravity of the firearm against which strikes with force the barrel to impart to the bolt operating sleeve sufficient live force to fly alone backward for partly unbolting, in a first stage, the breech bolt and obstructing means temporarily holding up the bolt actuating sleeve while the barrel with the breech shoe is flung again forward in order to completely unlock the breech bolt, in a second stage, and draw out the disconnected cartridge case from the barrel, which was partly loosened while the bolt actuating sleeve was flung alone backward.

10. In a firearm adapted to be used as a hand loading rifle or as an automatic loading firearm, having a straight pull breech and a sliding barrel, the barrel and the breech being under the influence of separate spring pressures, a breech shoe screwed to the barrel and guided in a stationary breech casing, a breech bolt having nibs, a bolt actuating sleeve for rotating said breech bolt to lock it in the breech shoe, a laterally projecting horizontal arm on said bolt actuating sleeve, a handle pushed on said arm capable of being horizontally moved at a right angle to the breech axis for the purpose of coupling the breech with the breech closing spring, a projection on the handle, a guide for the closing spring having a recess engaged by the projection of the inward moved handle, an adjusting spring for securing the handle in said coupled position and in its outer position when it is uncoupled from the closing spring guide, means for unlocking, in two stages, the breech bolt, and means for drawing out the disconnected cartridge case.

11. In a firearm adapted to be used as a hand loading rifle or as an automatic loading firearm, having a straight pull breech and a sliding barrel, the barrel and the breech being under the influence of separate spring pressures, a breech shoe screwed to the barrel and guided in a stationary breech casing, a breech bolt having nibs, a bolt actuating sleeve for rotating said breech bolt to lock it in the breech shoe, a laterally projecting horizontal arm on said bolt actuating sleeve, a handle pushed on said arm capable of being horizontally moved at a right angle to the breech axis for the purpose of coupling the breech with the breech closing spring, a hook-shaped projection provided on a lateral extension of said handle, a guide for the closing spring having a hook shaped recess engaged by said projection of the inward moved handle as long as the closing spring is expanded, an adjusting spring for securing the handle in said coupled position and in its outer position when it is uncoupled from the closing spring guide, means for unlocking in two stages the breech bolt, and means for drawing out the disconnected cartridge case.

12. In a firearm adapted to be used as a hand loading rifle or as an automatic loading firearm, having a straight pull breech and a sliding barrel, the barrel and the breech being under the influence of separate spring pressures, a breech shoe screwed to the barrel and guided in a stationary breech casing, a breech bolt having nibs, a bolt actuating sleeve for rotating said breech bolt to lock it in the breech shoe, a laterally projecting horizontal arm on said bolt actuating sleeve, a guide groove for this arm provided in the breech casing, a handle having a sleeve like part pushed over said arm and capable of being moved at a right angle to the breech axis for the purpose of coupling the breech with the breech closing spring, a projection on the handle, a guide for the closing spring having a recess engaged by the projection of the inward moved handle, a broad flat adjusting spring lodged in a recess of said arm arranged at a right angle to the breech axis, a nose on said spring adapted to engage correspondingly shaped recesses in the handle to secure the latter in said coupled position and in its outer position when it is uncoupled from the closing spring guide, means for unlocking, in two stages, the breech bolt, and means for drawing out the disconnected cartridge case.

13. In a firearm adapted to be used as a hand loading rifle or as an automatic loading firearm, having a straight pull breech and a sliding barrel, the barrel and the breech being under the influence of separate spring pressures, a breech shoe screwed to the barrel and guided in a stationary breech casing, a breech bolt having nibs, a bolt actuating sleeve for rotating said breech bolt to lock it in the breech shoe, a laterally projecting horizontal arm on said bolt actuating sleeve, a handle pushed on said arm capable of being horizontally moved at a right angle to the breech axis for the purpose of coupling the breech with the breech closing spring, a projection on the handle, a guide for the closing spring lodged in a groove of the breech casing, and having a recess engaged by that projection of the inward moved handle, a rod carrying the barrel spring and the closing spring arranged one behind the other, a sleeve like part on said guide surrounding this rod and acting as a support for the front end of the closing spring, an adjusting spring for securing the handle in said coupled position and in its outer position when it is uncoupled from the closing spring guide, means for unlocking, in two stages, the breech bolt, and means for drawing out the disconnected cartridge case.

14. In a firearm adapted to be used as a hand loading rifle or as an automatic loading firearm having a straight pull breech and a sliding barrel, the barrel and the breech being under the influence of separate spring pressures, a breech shoe screwed to the barrel and guided in a stationary breech casing, a projection provided beneath the barrel, a breech bolt having nibs, a bolt actuating sleeve for rotating said breech bolt to lock it in the breech shoe, a laterally projecting horizontal arm on said bolt actuating sleeve, a handle pushed on said arm capable of being horizontally moved at a right angle to the breech axis for the purpose of coupling the breech with the breech closing spring, a projection on the handle, a guide for this closing spring having a recess engaged by the projection of the inward moved handle and engaging said projection beneath the barrel on the backward movement of the latter when the breech is uncoupled from the closing spring to compress the latter as well as the barrel spring, an adjusting spring for securing the handle in said coupled position and in its outer position when it is uncoupled from the closing spring guide, means for unlocking, in two stages, the breech bolt, and means for drawing out the disconnected cartridge case.

15. In an automatic loading firearm having a straight pull breech and a sliding barrel, the barrel and the breech being under the influence of separate pressures, a breech shoe screwed to the barrel and guided in a stationary breech casing, a breech bolt having nibs, a bolt actuating sleeve for rotating said breech bolt to lock it in the breech shoe, a stationary limiting piece situated near the center of gravity of the firearm against which strikes with force the barrel to impart to the bolt operating sleeve sufficient live force to fly alone backward for partly unbolting in a first stage the breech bolt, an ejector consisting of a tongue and operated by a spring, said ejector being rotatably mounted in a piece of the bolt actuating sleeve serving for guiding the same in the breech casing, while the spring is secured in a lateral projection on the breech casing and obstructing means temporarily holding up the bolt actuating sleeve while the barrel with the breech is flung again forward in order to completely unlock the breech bolt, in a second stage, and draw out the disconnected cartridge case from the barrel partly loosened while the bolt actuating sleeve was flung alone backward when said ejector is in front of its spring.

In testimony that I claim the foregoing as my invention, I have signed my name in presence of two subscribing witnesses.

HANS STAMM.

Witnesses:
H. YOITEL,
EUGENE NABEL.